United States Patent [19]
Lee et al.

[11] Patent Number: 5,885,492
[45] Date of Patent: Mar. 23, 1999

[54] METHOD FOR PREPARING SPHERICAL PHOSPHOR PARTICLES

[75] Inventors: Jong Duk Lee, Department of Electronics Engineering College of Engineering, Seoul National University, Shin Lim-dong, Kwanak-ku; Jae Soo Yoo; Sung Hee Cho, all of Seoul, Rep. of Korea

[73] Assignees: Korean Information & Communication Co., Ltd.; Jong Duk Lee, both of Seoul, Rep. of Korea

[21] Appl. No.: 6,019

[22] Filed: Jan. 12, 1998

[30] Foreign Application Priority Data

Apr. 18, 1997 [KR] Rep. of Korea ............... 1997-14442

[51] Int. Cl.⁶ ............................ B29B 9/00; C09K 11/00
[52] U.S. Cl. .................................. 264/12; 264/13; 264/21
[58] Field of Search .................... 264/21, 12, 13

[56] References Cited

U.S. PATENT DOCUMENTS

| 4,871,489 | 10/1989 | Ketcham | 264/13 |
| 5,294,368 | 3/1994 | Karam | 252/301.4 |
| 5,695,809 | 12/1997 | Chadha | 427/64 |

OTHER PUBLICATIONS

Albessard et al, "S26–3 Phosphor Layers Made of Spherical Particles", Asia Display '95, pp. 643–646.

Primary Examiner—James Derrington
Attorney, Agent, or Firm—Dilworth & Barrese

[57] ABSTRACT

A method for preparing spherical phosphor particles is disclosed, wherein a precursor solution of phosphors is decomposed to solid particles by aerosol pyrolysis and rapid cooling and subsequently the solid particles are heat-treated at a temperature of 1000° C. to 1600° C. for a period of 1 hour to 9 hours.

20 Claims, 5 Drawing Sheets

(a) before heat-treatment (b) after heat-treatment at 1200°C 3hrs

METHOD FOR PREPARING SPHERICAL PHOSPHOR PARTICLES

BACKGROUND OF THE INVENTION

1. Field of the Invention

The present invention relates to a method for preparing phosphor particles which may be used in a broad range of display applications, such as FED, PDP and CRT screens, and more particularly a method for preparing spherical phosphor particles, in which a precursor solution of phosphors is decomposed to solid particles by aerosol pyrolysis and rapid cooling and subsequently the solid particles are heat-treated at high temperature so that phosphor particles exhibiting improved luminance property can be formed in spherical shape.

2. Description of the Prior Art

The phosphors are conventionally prepared by the combustion method which involves pulverizing process, such as grinding and ball milling. Though the combustion method has the advantage in cost and efficiency in mass production, the phosphors produced thereby contain some raw materials due to the incomplete reaction among different solid materials and further are apt to be contaminated by impurities mixed during the pulverizing process. In addition, the phosphor surface is damaged during the grinding and milling process, resulting in the loss of the emission intensity. Since the properties such as high purity and high luminescent efficiency are required for the phosphors used in HDTV display applications, several alternative synthetic methods, such as sol-gel method or hydrothermal method, have been experimentally tried for achieving the above properties, but those methods have the disadvantage in cost and efficiency in mass production. Recently, pearl-like spherical phosphor particles were prepared by the induction thermal plasma method (Asia Display '95, p 643~646), in which raw phosphor particles produced by the combustion method were introduced into the plasma flame at the temperature of several thousand degrees, where the particles are melt, partly evaporated, and then resolidified on subsequent cooling. However, the plasma method may lead to not only change of phosphor composition, but also uneven distribution of luminescent centers in host lattices, resulting in decrease of luminescent efficiency. Furthermore, additional equipments are needed to adopt the plasma method for mass production of the pearl-like spherical phosphor particles.

SUMMARY OF THE INVENTION

An object of the present invention is to provide a method for preparing spherical phosphor particles with improvement in both the luminescence output and of particle size uniformity.

Another object of the present invention is to provide a method for preparing spherical phosphor particles, thereby avoiding undesirable contamination and further impregnating activators over host lattices more uniformly and effectively.

Still another object of the present invention is to provide a method for preparing spherical phosphor particles, which is cost-effective and requires no special equipment whatsoever.

In order to accomplish the above and other objects, the present invention comprises the steps of generating aerosol through a filter from a precursor solution having host material and activator, forming solid particles from the aerosols by thermal decomposition and subsequent rapid cooling, and heating the solid particles under ambient atmosphere at a high temperature between about 1100° C. and 1600° C. for a time period between 1 hour and 9 hours.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Now, preferred embodiments of the present invention will be described with reference to the accomplishing drawings.

Embodiment 1.

A. preparation of precursor solution

Yttrium nitrate hexahydrate, $[Y(NO_3)_2.6H_2O]$ and europium chloride hexahydrate, $[EuCl_3.6H_2O]$, were used as precursor materials of the phosphor, yttrium oxide as host lattice and europium as activator, respectively.

0.2M of the $[Y(NO_3)_2.6H_2O]$ and 7 moles percent of the $[EuCl_3 .6 H_2O]$ by the amount of the $[Y(NO_3)_2.6H_2O]$ were completely dissolved in 1 l of D. I. water.

Although the europium chloride hexahydrate were used for the precursor of europium as the activator in this embodiment 1, others containing a europium element, for example an europium nitrate hexahydrate or a mixture of europium chloride hexahydrate and praseodymium nitrate, may be used therefor.

B. aerosol generation

Figure 1:
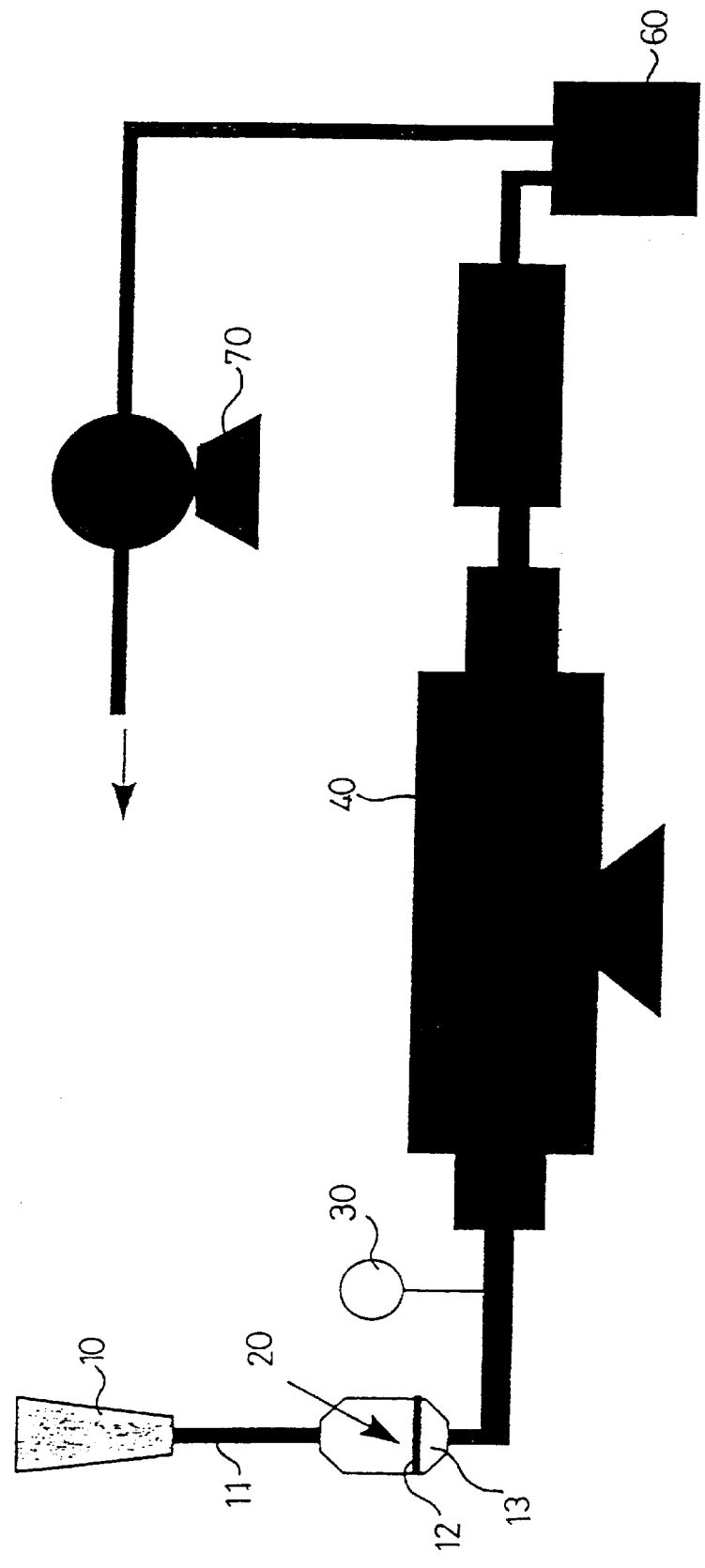
FIG. 1 shows a schematic illustration of an apparatus used in the present invention, comprising a filter expansion generator and a thermal reactor.

The precursor solution was sprayed to aerosol streams through a glass filter provided by a filter expansion aerosol generator (20) (hereinafter referred to FEAG), which is illustrated in FIG. 1.

The precursor solution contained in a solution container (10) is sprayed through a pneumatic nozzle (11) to a glass filter surface (12) using a carrier gas, where a thin liquid film is formed. The liquid film is pressed by the carrier gas through filter pores formed on the filter surface (12) and expanded into a low pressure chamber (13) of 60 Torr, in which droplets of about 10 μm in diameter are formed. The droplet streams may be referred to the aerosol streams. Reference numerals (30) and (70) represent a vacuum gauge and a vacuum pump respectively.

Instead of using the FEAG method as above, other methods, such as nozzle spray, ultrasonic spray, vibrating orifice, electrospray method and even a usual aerosol generator may be used for generating aerosol stream.

C. thermal decomposition by aerosol pyrolysis

The aerosol streams were delivered into a hot-wall reactor (40), in which temperature was maintained isothermally at between 600° C. and 1000° C. As the aerosol streams pass through the hot reactor (40), solvent evaporates and salt decomposes to form particles.

Figure 2:
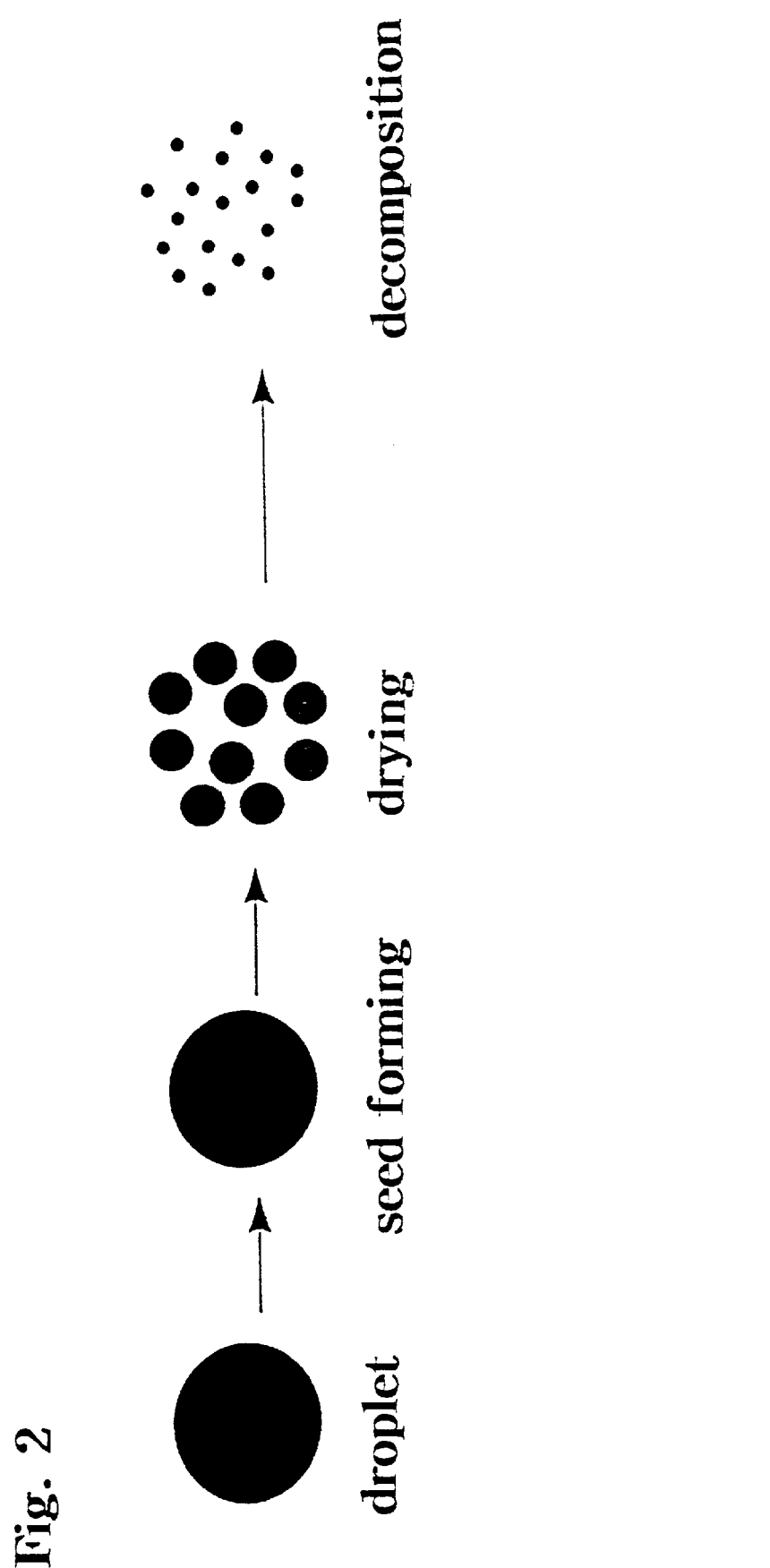
FIG. 2 shows particles formation sequence in the aerosol pyrolysis process.

FIG. 2 shows several steps in the process of formation of the particles, in which crystal seeds are formed in the droplets at a relatively low temperature, then the solvent in the droplets are completely dried to form large particles as the temperature rises. Then the large particles are decomposed to smaller particles when the temperature reaches a high enough temperature between 800° C. and 1000° C. Subsequently, the decomposed particles are solidified on rapid cooling and water vapors are cooled through a liquid nitrogen trap (60), installed at the end of the hot reactor (40). The particles obtained in this step may be referred to solid particles.

D. heat treatment

The solid particles were heat treated at around 1000° C. for a period of 3 hours under ambient atmosphere in a substantially contaminant-free environment. The heat treatment is an essential step to improve the crystalline of yttrium oxide and to impregnate the activator into the host lattices effectively and may be performed at a temperature between 1000° C. and 1600 ° C. and for a time period between 1 hour to 9 hours. Consequently, preparation of the spherical phosphor particles is completed on the heat treatment.

Further, a step for reducing the heated solid particles may be additionally included. The reduction step may be carried out under carbon atmosphere or hydrogen atmosphere at a temperature of 800° C. to 1000° C. for a period of 1 hour to 3 hours.

Also, we prepared other precursor solutions, for example between 0.2 M and 0.8M of the $[Y(NO_3)_2 \cdot 6H_2O]$ dissolved with between 8 moles and 12 moles percent of the $[EuCl_3 \cdot 6H_2O]$ by the amount of the $[Y(NO_3)_2 \cdot 6H_2O]$ in 1 L of D. I. water and followed the above steps for preparing spherical phosphor particles. The spherical phosphor particles obtained from those precursor solutions of the various concentrations showed the improved luminescence efficiency similar to that of the particles of the above embodiment 1.

Embodiment 2.

A solution was prepared from 0.1M of $Sr(NO_3)_2$ and 0.1M of $Ti(NO_3)_2$ as a precursor of host lattices and 7 moles percent of $Pr(NO_3)_3$ as a precursor of activator by the total amount of the $Sr(NO_3)_2$ and the $Ti(NO_3)_2$. Then, the subsequent steps, such as aerosol generation, thermal decomposition, and heat treatment process, were carried on in the same manner as those of the embodiment 1.

Embodiment 3.

A solution was prepared from 0.1M of $Zn(NO_3)_2$ and 0.1M of $Ga(NO_3)_3$ as a precursor of host lattices and 7 moles percent of $Mn(NO_3)_4$ as a precursor of activator by the total amount of the $Zn(NO_3)_2$ and the $Ga(NO_3)_3$. Then, the subsequent steps, such as aerosol generation, thermal decomposition, and heat treatment process, were carried on in the same manner as those of the embodiment 1.

Embodiment 4.

A solution was prepared from 0.1M of $Y(NO_3)_3$ and 0.1M of $Si(OC_2H_5)_4$ as a precursor of host lattices and 7 moles percent of $Ce(NO_3)_3$ as a precursor of activator by the total amount of the $Y(NO_3)_2$ and the $Si(OC_2H_5)_4$. Then, the subsequent steps, such as aerosol generation, thermal decomposition, and heat treatment process, were carried on in the same manner as those of the embodiment 1.

Embodiment 5.

A solution was prepared from 0.1M of $Y(NO_3)_3$ and 0.1M of $Al(NO_3)_3$ as a precursor of host lattices and 7 moles percent of $Ce(NO_3)_3$ as a precursor of activator by the total amount of the $Y(NO_3)_3$ and the $Al(NO_3)_3$. Then, the subsequent steps, such as aerosol generation, thermal decomposition, and heat treatment process, were carried on in the same manner as those of the embodiment 1.

Embodiment 6.

A solution was prepared from 0.1M of $Y(NO_3)_3$ and 0.05M of $Al(NO_3)_3$ and 0.05M $Ga(NO_3)_3$ as a precursor of host lattices and 7 moles percent of $Tb(NO_3)_3$ or $Tm(NO_3)_3$ as a precursor of activator by the total amount of the $Y(NO_3)_2$, the $Al(NO_3)_3$, and $Ga(NO_3)_3$. Then, the subsequent steps, such as aerosol generation, thermal decomposition, and heat treatment process, were carried on in the same manner as those of the embodiment 1.

The following equations are illustrative of the chemical reactions which occur during preparation of the spherical phosphor particles according to the method of the present invention.

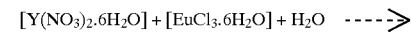

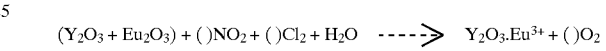

Characteristics of spherical phosphor particles prepared according to the present invention were tested with scanning election microscopy (SEM).

Figure 3:
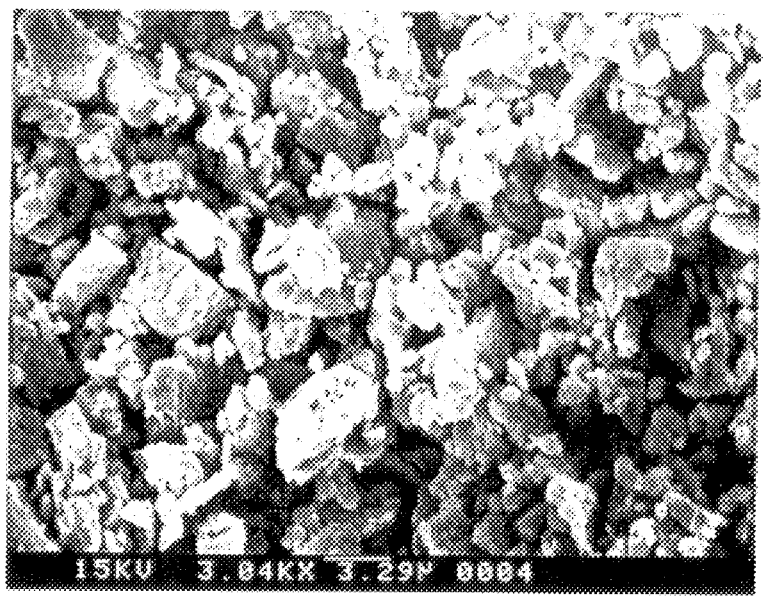
FIG. 3 shows SEM photographs of $Y_2O_3$: Eu particles prepared in accordance with the conventional combustion method.
Figure 4:
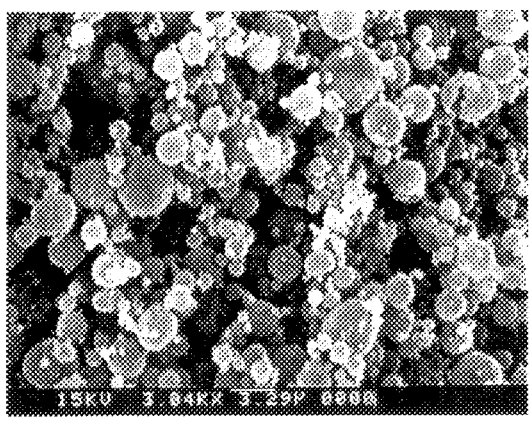
FIGS. 4(A) and (B) show SEM photographs of $Y_2O_3$: Eu particles prepared by the aerosol pyrolysis and subsequent cooling process before and after heat treatment at a temperature of 1200° C. for a period of 3 hours, respectively.
Figure 4:
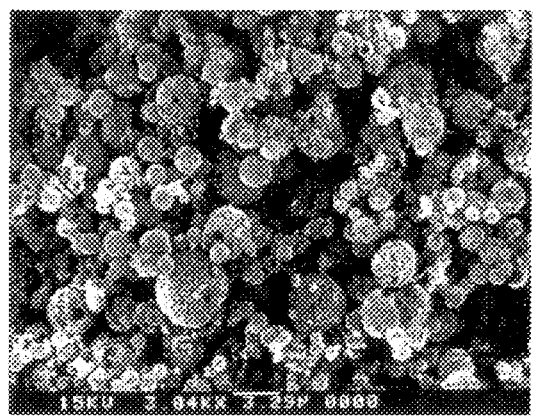

FIG. 3 shows the SEM photographs of $Y_2O_3$: Eu particles prepared by combustion method and FIGS. 4(A) and (B) show the SEM photographs of $Y_2O_3$: Eu particles prepared by the aerosol pyrolysis and subsequent cooling steps, before heat treatment and after heat treatment of 1200° C., 3 hours, respectively. While conventional phosphor particles have a polyhedral shape and are partially agglomerated, those of the aerosol pyrolysis have a spherical shape and are well dispersed. Furthermore, after heat treatment at 1200° C. for 3 hours, the contraction of spherical particles may be observed, resulting in the smaller diameter of spherical particles.

Figure 5:
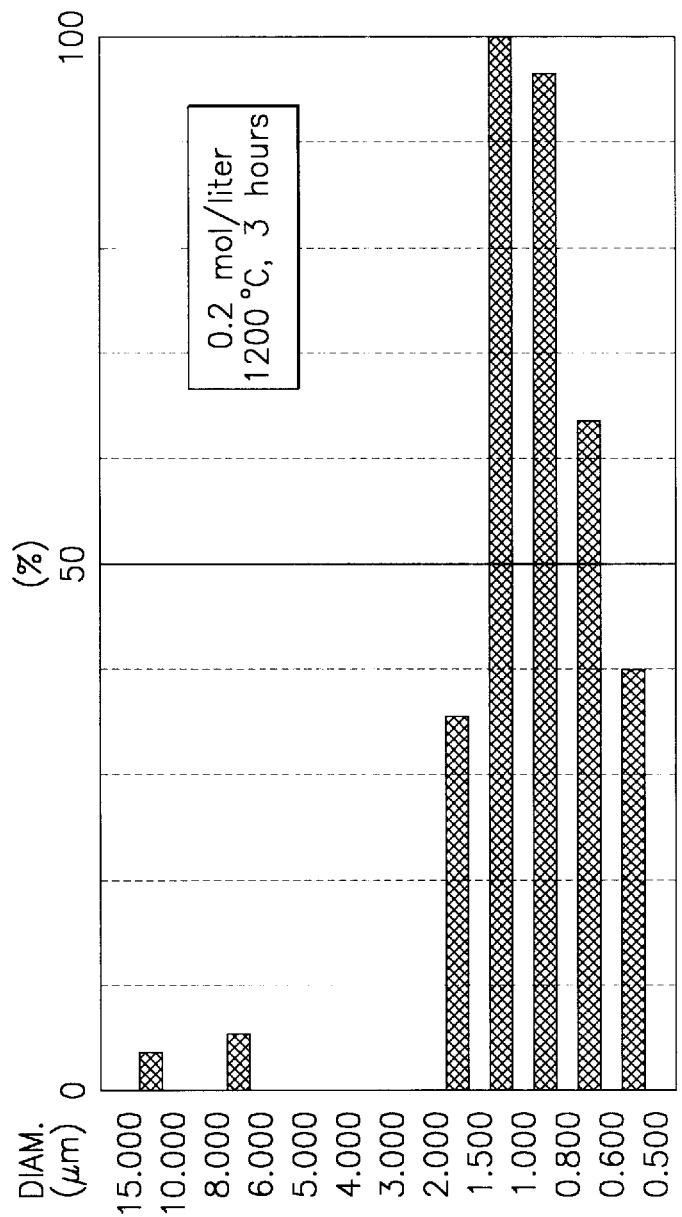
FIG. 5 shows particle size distribution of $Y_2O_3$: Eu particles prepared by the present invention.

As shown in FIG. 5, average size of spherical phosphor particles prepared according to the Embodiment 1 is around 1 $\mu$m in diameter, but may be controlled to submicron, depending on the concentration of the host material or the diameter of the droplet formed in the aerosol generation step.

The properties of the $Y_2O_3$: Eu spherical phosphors prepared by the present invention are compared with those by the conventional method as follows

| $Y_2O_3$:Eu | brightness (cd/m$^2$) | luminescence efficiency (lm/w) | chromaticity |
|---|---|---|---|
| conventional phosphors | 90 | 1.59 | X = 0.614<br>Y = 0.362 |
| Spherical phosphors particles | 120 | 1.88 | X = 0.628<br>Y = 0.357 |

400 V, 51 × 10$^{-6}$ A/cm$^2$, Du:1

The present invention is related to a method for which a precursor solution of phosphors is decomposed to solid particles by aerosol pyrolysis using a hot reactor at a temperature of between 600° C. to 1000° C. Subsequently, the solid particles are more crystallized at a high temperature of 1000° C. to 1600° C. for a time period between 1 hour and 9 hours so that phosphors particles exhibiting improved luminescence efficiencies are formed in spherical shape.

The spherical phosphor particles formed by the present invention have a uniform particle size distribution around 1 μm and the brightness are enhanced over commercially available phosphors made by the combustion method. Furthermore, the particle size and surface shape may be easily controlled and the impurities may be minimized. Also, activators are more uniformly and effectively distributed over host lattices in accordance with the present invention.

Accordingly, the spherical phosphor particles with the above properties may be effectively used in a conventional field emission display.

While preferred embodiments of the invention have been described and shown as above, it is understood that alternatives and modifications, such as those suggested and others, may be made thereto, falling within the scope of the present invention.

What is claimed is:

1. A method for preparing spherical phosphor particles, said method comprising the steps of:

(a) spraying a uniform precursor solution having a host material and an activator through a nozzle using a carrier gas, whereby a thin liquid film is formed;

(b) pressing the liquid film through filter pores formed in a film surface by the carrier gas and expanding the film into a low pressure chamber, thereby generating aerosols;

(c) forming solid particles from the aerosols by thermal decomposition and rapid cooling; and (d) heating the solid particles at a temperature of 1000° C. to 1600° C. for a period of 1 hour to 9 hours.

2. A method for preparing spherical phosphor particles as claimed in claim 1, wherein the uniform precursor solution comprises 0.2~0.8M of the host material and 4.0~12.0 moles percent of the activator based on the total amount of the host material per liter of D. I. water.

3. A method for preparing spherical phosphor particles as claimed in claim 1, which further comprises the step of reducing the heated solid particles under carbon atmosphere at a temperature of 800° C. to 1000° C. for a period of 1 hour to 3 hours.

4. A method for preparing spherical phosphor particles as claimed in claim 1, which further comprises the step of reducing the heated solid particles under hydrogen atmosphere at a temperature of 800° C. to 1000° C. for a period of 1 hour to 3 hours.

5. A method for preparing spherical phosphor particles as claimed in claim 1, wherein the host material is $Y(NO_3)_3$ and the activator is selected from the group consisting of $Eu(NO_3)_3$, $EuCl_3$ and a mixture of $EuCl_3$ and $Pr(NO_3)_3$.

6. A method for preparing spherical phosphor particles as claimed in claim 1, wherein the host material includes $Sr(NO_3)_2$ and $Ti(NO_3)_2$ and the activator is selected from the group consisting of $Pr(NO_3)_3$ and $PrCl_3$.

7. A method for preparing spherical phosphor particles as claimed in claim 1, wherein the host material includes $Zn(NO_3)_2$ and $Ga(NO_3)_3$ and the activator is $Mn(NO_3)_4$.

8. A method for preparing spherical phosphor particles as claimed in claim 1, wherein the host material includes $Y(NO_3)_3$ and $Si(OC_2H_5)_4$ and the activator is $Ce(NO_3)_3$.

9. A method for preparing spherical phosphor particles as claimed in claim 1, wherein the host material includes $Y(NO_3)_3$ and $Al(NO_3)_3$ and the activator is $Ce(NO_3)_3$.

10. A method for preparing spherical phosphor particles as claimed in claim 1, wherein the host material includes $Y(NO_3)_3$, $Al(NO_3)_3$ and $Ga(NO_3)_3$ and the activator is $Tb(NO_3)_3$.

11. A method for preparing spherical phosphor particles as claimed in claim 1, wherein the host material includes $Y(NO_3)_3$, $Al(NO_3)_3$ and $Ga(NO_3)_3$ and the activator is $Tm(NO_3)_3$.

12. A method for preparing spherical phosphor particles as claimed in claim 1, wherein the aerosols are generated by a filter expansion aerosol generator.

13. A method for preparing spherical phosphor particles as claimed in claim 1, wherein the thermal decomposition is conducted at a temperature of 600° C. to 1000° C.

14. A method for preparing spherical phosphor particles as claimed in claim 2, wherein the host material is $Y(NO_3)_3$ and the activator is selected from the group consisting of $Eu(NO_3)_3$, $EuCl_3$ and a mixture of $EuCl_3$ and $Pr(NO_3)_3$.

15. A method for preparing spherical phosphor particles as claimed in claim 2, wherein the host material includes $Sr(NO_3)_2$ and $Ti(NO_3)_2$ and the activator is selected from the group consisting of $Pr(NO_3)_3$ and $PrCl_3$.

16. A method for preparing spherical phosphor particles as claimed in claim 2, wherein the host material includes $Zn(NO_3)_2$ and $Ga(NO_3)_3$ and the activator is $Mn(NO_3)_4$.

17. A method for preparing spherical phosphor particles as claimed in claim 2, wherein the host material includes $Y(NO_3)_3$ and $Si(OC_2H_5)_4$ and the activator is $Ce(NO_3)_3$.

18. A method for preparing spherical phosphor particles as claimed in claim 2, wherein the host material includes $Y(NO_3)_3$ and $Al(NO_3)_3$ and the activator is $Ce(NO_3)_3$.

19. A method for preparing spherical phosphor particles as claimed in claim 2, wherein the host material includes $Y(NO_3)_3$, $Al(NO_3)_3$ and $Ga(NO_3)_3$ and the activator is $Tb(NO_3)_3$.

20. A method for preparing spherical phosphor particles as claimed in claim 2, wherein the host material includes $Y(NO_3)_3$, $Al(NO_3)_3$ and $Ga(NO_3)_3$ and the activator is $Tm(NO_3)_3$.

* * * * *